US010521835B2

(12) United States Patent
Karanth et al.

(10) Patent No.: US 10,521,835 B2
(45) Date of Patent: Dec. 31, 2019

(54) CONTENT VIEWING OPTIONS WHEN ADVERTISEMENTS ARE BLOCKED

(71) Applicant: Adobe Inc., San Jose, CA (US)

(72) Inventors: Shrinidhi P. Karanth, Bengaluru (IN); Gopalakrishna M. P. Sharma, Bengaluru (IN); Dwight O. Rodgers, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 448 days.

(21) Appl. No.: 15/160,833

(22) Filed: May 20, 2016

(65) Prior Publication Data

US 2017/0337600 A1 Nov. 23, 2017

(51) Int. Cl.
  *G06Q 30/06* (2012.01)
  *H04L 29/06* (2006.01)
  *G06Q 30/02* (2012.01)
  *G06F 3/0484* (2013.01)

(52) U.S. Cl.
  CPC ....... *G06Q 30/0601* (2013.01); *G06F 3/0484* (2013.01); *G06Q 30/0277* (2013.01); *H04L 65/1063* (2013.01); *H04L 65/4084* (2013.01)

(58) Field of Classification Search
  CPC combination set(s) only.
  See application file for complete search history.

(56) References Cited

U.S. PATENT DOCUMENTS

| 5,594,794 A * | 1/1997 | Eyer ............... H04N 7/165 380/231 |
| 9,160,540 B2* | 10/2015 | Xu ............... H04L 9/3247 |
| 2005/0286645 A1* | 12/2005 | D'Alessandro ......... H04L 27/24 375/257 |
| 2013/0080180 A1* | 3/2013 | Foladare ............ G06Q 30/0241 705/1.1 |
| 2014/0229298 A1* | 8/2014 | Grun ............... G06Q 30/0241 705/14.73 |
| 2015/0033344 A9* | 1/2015 | Holloway ............. G06F 16/958 726/24 |

* cited by examiner

*Primary Examiner* — Alexandru Cirnu
(74) *Attorney, Agent, or Firm* — SBMC

(57) ABSTRACT

A digital medium environment includes a content provider that receives a request for content and provides the requested content to a computing device. An improved advertisement detection method implemented by the content provider comprises determining whether the requesting computing device is blocking advertisements provided with the content. If the requesting computing device is blocking advertisements, the content provider may prevent the requested content from being displayed unless a user of the requesting device selects an alternate option for viewing the requested content. Alternate options for viewing the requested content include purchasing a subscription to the content provider, paying the content provider to view only the requested content, or enabling display of advertisements at the requesting computing device. The improved advertisement detection method protects content provider revenue streams and informs users of alternate options for viewing content from a trusted content source.

20 Claims, 8 Drawing Sheets

CONTENT VIEWING OPTIONS WHEN ADVERTISEMENTS ARE BLOCKED

BACKGROUND

Content providers often publish content for free and earn revenue through advertisements displayed with the content. For example, users may freely view video content that is interrupted by advertisements at various points during playback. However, users generally prefer to view content without advertisements and often implement ad-blocking software on their devices. Although ad-blocking software enables users to view content independent of advertisements, content providers do not generate revenue from blocked advertisements. To protect advertisement revenue, content providers tend to prevent users from viewing content if the content provider detects that a device is blocking advertisements. In order to view blocked content, many users choose to navigate to a different provider that allows content viewing with ad-blocking software enabled.

Content providers often make content available to users under two different business models. The first model publishes content together with advertisements and allows content providers to generate revenue through purchased advertisements. For example, a content provider may publish a video interrupted by advertisements during playback, may publish a website may be interspersed with advertisements, and so on. The second model requires that users pay to view content on either a pay-per-view basis or subscription basis. For example, a content provider offering pay-per-view may permit a user to pay a one-time fee to view a piece of content without advertisements. A content provider offering a subscription may permit a user to pay a subscription fee for unlimited content viewing without advertisements. To maximize revenue, some content providers offer content through various combinations of these first and second models. In this manner, the same content may be provided without advertisements to subscribing users and may be provided with advertisements to non-subscribing users.

However, many users who want to view content without advertisements and without paying subscription fees install ad-blocking software on their devices. Ad-blocking software can operate in a variety of manners, depending on how content providers publish content. Some content providers require that a user device send separate requests for content and advertisements. In this approach, ad-blocking software permits the user device to send content requests but causes advertisement requests to fail. Alternatively, content providers may provide content and advertisements together in response to a single request. In this approach, ad-blocking software may access a description of the content to identify and may remove information corresponding to advertisements. For example, ad-blocking software may access a content manifest file including content and advertisement segments and remove the advertisement segments before passing the manifest file to a content viewer application. Alternatively or additionally, ad-blocking software may prevent a requesting computing device from querying one or more advertisement segments or advertisement descriptors associated with requested content. Alternatively, ad-blocking software may remove one or more cue points from requested content that correspond to locations where advertisements should be inserted in the content. Alternatively or additionally, ad-blocking software may spoof advertisements by inserting advertisement segments into requested content that are shorter in duration than an intended advertisement segment for the requested content. Some ad-blocking software may attempt to tamper with one or more digital signatures associated with requested content, as is described in further detail in U.S. patent application Ser. No. 13/950,552, now U.S. Pat. No. 9,160,540, the disclosure of which is incorporated by reference in its entirety. In any approach, ad-blocking software causes a content viewer application of the user device to display the requested content without any associated advertisements.

Because advertisements generate significant revenue, many content providers prohibit users from viewing content if a user's device is detected as blocking advertisements. Consequently, users with ad-blocking software are discouraged from returning to view additional content from these content providers. However, many users are unaware that the reason they cannot view content is because their device is blocking advertisements. While many users would be willing to disable their ad-blocking software or pay the content provider in order to view this content, options for doing so are not readily apparent. Users may assume that there is a problem with the content provider and turn to different sources for viewing the content. These different sources may provide users access to pirated versions of content, which are often of a lower quality and accompanied by malicious data that is harmful to the user device. Thus, ad-blocking software can be harmful to interests of both the content provider and the end user.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, in a digital medium environment including an advertisement detection component of a content provider, an improved advertisement detection method implemented by the content provider, the method comprising: receiving a request for content from a computing device; determining that the computing device prevents advertisements from being displayed at the computing device; preventing requested content from being displayed at the computing device in response to determining that the computing device prevents advertisements from being displayed; and causing the computing device to display one or more alternative options for displaying the requested content.

In one or more implementations, in a digital medium environment in which a content provider can use an advertisement detector component to determine if advertisements are blocked, one or more computer-readable storage media store instructions that implement the advertisement detector component which, responsive to execution by the content provider device, perform improved advertisement detection operations comprising: receiving a request for a piece of content from a computing device; determining that the computing device prevents advertisements from being displayed; preventing the requested piece of content from being displayed at the computing device in response to determining that the computing device prevents advertisements from being displayed; causing the computing device to display one or more options including an option for a user of the computing device to pay a content provider in order to view the requested piece of content; and permitting the computing device to display the requested piece of content in response to receiving payment from the user of the computing device to view the requested content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
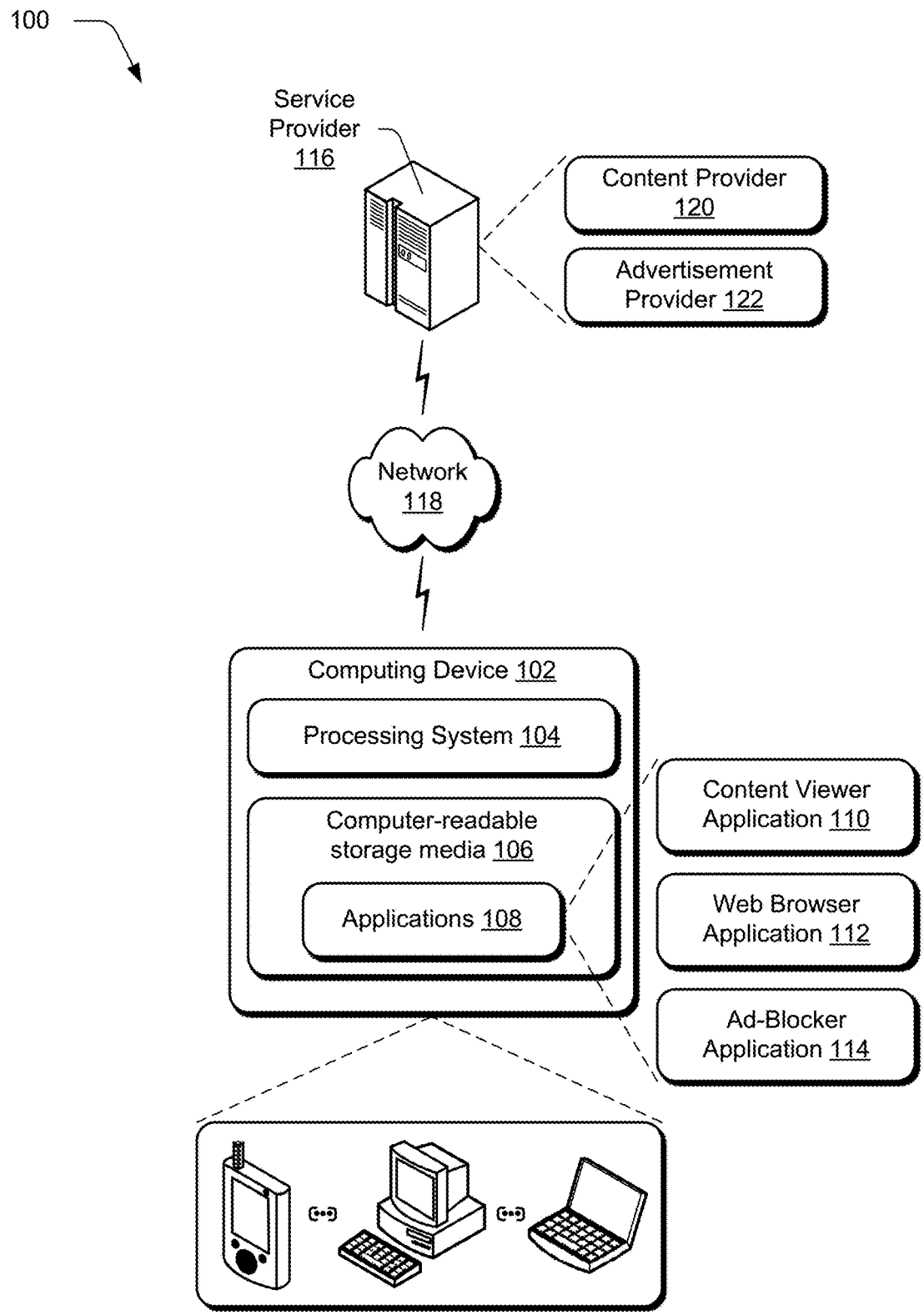
FIG. 1 is an illustration of a digital medium environment in an example implementation that is operable to employ techniques described herein.

In the description below, advertisement detection techniques are described in the context of determining that advertisements associated with content are being blocked and providing alternative options for viewing the content. It is to be appreciated and understood, however, that the advertisement detection techniques described herein apply also to content and advertisements that are not visibly displayed by a user device, such as audio content and advertisements.

Introduced herein are techniques that address the drawbacks of blocking advertisements, such as those mentioned above. The techniques utilize a novel advertisement detection method in which a determination is made as to whether a user device requesting to view content blocks display of advertisements. In response to detecting that the requesting device is blocking advertisements, content is prevented from being displayed at the requesting device. One or more options for viewing content are determined based on a cost associated with viewing the content and the one or more options are displayed to a user of the device.

When a content provider determines that a device requesting content is blocking advertisements, the content provider may prevent the requesting device from displaying the content. In order to inform the user that content cannot be displayed because the user's device is blocking advertisements, the content provider may cause display of a visual indication informing the user why the content cannot be displayed. Additionally, the visual indication may indicate that alternative options for viewing the content exist and the content provider may cause display of one or more options to continue viewing the content. These options include manually disabling ad-blocking software on the user's device, purchasing a subscription to the content provider, paying a fee to view the requested content, and so on. The user may then select any one of the displayed options in order to continue viewing the requested content.

In response to receiving a user selection of one of the displayed options, the content provider causes display of an interface corresponding to the selected option. For example, if the user selects an option to purchase a subscription to the content provider, the content provider displays a subscription interface of the content provider. Similarly, if the user selects an option to pay a fee to view the requested content, the content provider displays an interface for the user to pay the corresponding fee. If the user selects an option to disable ad-blocking software, the content provider displays an interface that instructs the user to manually disable ad-blocking software on the user's device and includes a selectable prompt to view the requested content after disabling the ad-blocking software. In response to confirming receipt of the subscription payment or the fee to view the requested content, the content provider is configured to permit display of the requested content without advertisements. Likewise, in response to user selection of the selectable prompt to view the requested content after manually disabling ad-blocking software, the content provider is configured to determine whether the user device is still blocking advertisements and allow display of the requested content with advertisements in response to determining that the user device is not blocking advertisements.

By providing users with different options for viewing blocked content, the techniques described herein protect content providers' revenue streams from losses otherwise caused by ad-blocking software and proxy servers. Additionally, because users may perceive that content is blocked due to a fault of the content provider, and revert to unauthorized content providers to obtain the content, the techniques described herein protect user devices from malicious code that may be downloaded from these unauthorized content providers.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some embodiments, applications 108 may include a content viewer application 110. The content viewer application 110 is configured to display requested content and associated advertisements, as described below in more detail. Applications 108 may also include a web browser application 112, which is operable to access various kinds of web-based resources (e.g., content and services). Applications 108 may also include ad-blocker application 114. The ad-blocker application 114 is configured to prevent display of advertisements associated with requested content, as described below in more detail. Applications 108 may also represent a client-side component having integrated functionality operable to access web-based resources (e.g., a network-enabled application), browse the Internet, interact with online providers, and so forth. Applications 108 may further include an operating system for the computing device and other device applications.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, a wearable device (e.g., assuming a configuration that can be worn by a user such as a watch or glasses) and so forth. Thus, the computing device 102 may range from full resource devices with substantial memory and processor resources (e.g., personal computers, game consoles) to a low-resource device with limited memory and/or processing resources (e.g., mobile and wearable devices). Additionally, although a single computing device 102 is shown, the computing device 102 may be representative of a plurality of different devices to perform operations "over the cloud" as further described in relation to FIG. 8.

The digital medium environment 100 further depicts one or more service providers 116, configured to communicate with computing device 102 over a network 118, such as the Internet, to provide a "cloud-based" computing environment. Generally speaking, service provider 116 is configured to make various resources available over the network 114 to clients. As discussed herein, these various resources include content from a content provider 120 and advertisements from an advertisement provider 122. In some scenarios, users may sign up for accounts that are employed to access corresponding resources from the content provider 120. The content provider 120 may authenticate credentials of a user (e.g., username and password) before granting access to an account and corresponding content. Other content may be made freely available, (e.g., without authentication or account-based access) by being accompanied with one or more advertisements from advertisement provider 122. The content provided by content provider 120 can include any suitable combination of services and/or content typically made available over a network by one or more providers. Some examples of services include, but are not limited to, an advertisement service (such as one that provides advertisements such as advertisement provider 122), a web development and management service, a collaboration service, a social networking service, a messaging service, and so forth. Content may include various combinations of video, audio, multi-media streams, games, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of a content provider in accordance with one or more implementations.

Example Content Provider

Figure 2:
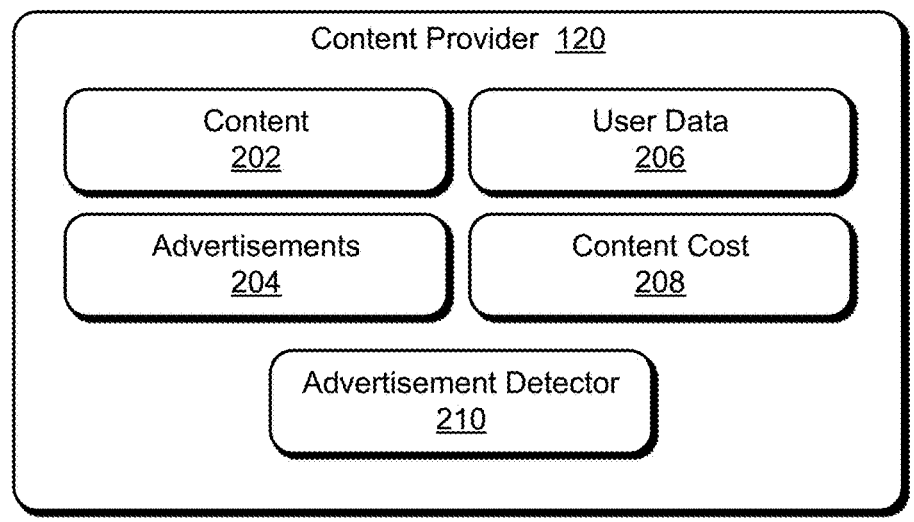
FIG. 2 illustrates an example content provider including content, advertisements, user data, a content cost component, and an advertisement detector component in accordance with one or more implementations.
Figure 2:
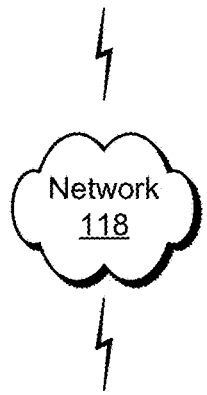
Figure 2:
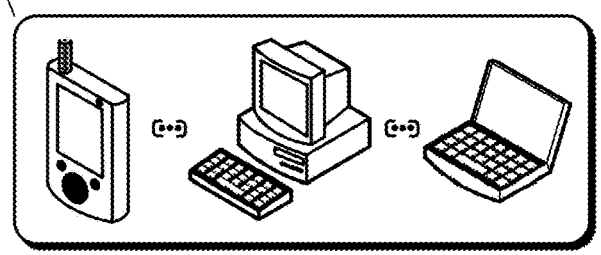

FIG. 2 illustrates a digital medium environment 200 that includes an example content provider 120. In this implementation, the content provider 120 includes content 202, advertisements 204, user data 206, content cost component 208, and advertisement detector component 210.

Content 202 is representative of one or more pieces of content that may be provided by the content provider 120 to a requesting computing device 102 via network 118. As discussed above, content 202 may include any one or combination of video, audio, multi-media streams, games, animations, images, web documents, web pages, applications, device applications, and the like.

Advertisements 204 are representative of one or more advertisements that may be provided with content 202 by the content provider 120 to a requesting computing device 102 via network 118. Although advertisements 204 illustrated as stored at content provider 120, is to be appreciated and understood that advertisements 204 may be provided to computing device 102 via a different source. For example, advertisements 204 may be stored at advertisement provider 122, illustrated in FIG. 1, and delivered to the requesting computing device 102 via network 118 independent of being transmitted to the content provider 120.

User data 206 is representative of information stored at the content provider 120 and may include user credentials (e.g., usernames and passwords), user subscription information, and so forth. User data 206 is further representative of information describing previous content requests from a particular user and describing the particular user's interaction with advertisements displayed with the content. For example, user data 206 may include a list of pieces of content previously requested by a user, a list of advertisements provided to the user, a list of advertisements that were interacted with by the user, and information describing the user's subsequent activity with an advertiser after interacting with an advertisement. Additionally, user data 206 is representative of information that may be obtained from computing device 102 in response to receiving a request for content from computing device 102. For example, when computing device 102 requests content from content provider 120, the request may include information about the computing device 102 in the form of metadata. This information may include, but is not limited to, one or more of a geographic location of computing device 102, a device type of computing device 102, available bandwidth of computing device 102, or a network service provider associated with computing device 102.

Content cost component 208 is representative of functionality that determines a cost associated with viewing a piece of requested content and stores content cost information. By determining a cost associated with viewing a piece of content, content cost component 208 enables content provider 120 to determine what alternate viewing options may be provided to a user in an event that advertisements are being blocked at the user's device. As discussed in more detail below, a cost associated with viewing a piece of content is determined based on a variety of factors. These factors include, but are not limited to, the geographic location of a device requesting the content, one or more types of advertisements associated with the requested content, a device type of the device requesting the content, historic content cost information for content that is similar to the requested content, and so on.

Advertisement detector component 210 is representative of functionality that determines whether the computing device requesting content from content provider 120 is blocking advertisements (such as via use of the ad blocker application 114 illustrated in FIG. 1). By determining whether a requesting computing device is blocking advertisements, content provider 120 can determine whether to permit the requesting computing device to display the requested content or prevent the device from displaying the requested content.

Although illustrated as component of content provider 120, it is to be appreciated and understood that advertisement detector component 210 may be implemented remotely from content provider 120. For example, advertisement detector component 210 may be implemented as a stand-alone advertisement detection service that content provider 120 can query to determine whether a computing device requesting content is blocking advertisements.

Having considered an example content provider and its components, consider now a content cost component and an advertisement detector component in more detail in accordance with one or more embodiments.

Content Cost Component

In accordance with one or more implementations, content cost component 208 determines a cost associated with individual pieces of content 202.

The cost associated with viewing a piece of content changes based on several factors. These factors include, but are not limited to, the geographic location of a user viewing the content, a device type of the device on which the content is displayed, and the type of content being displayed. As discussed herein, geographic locations may be determined by any suitable measure, such as by political boundaries, proximity to a specific location or event, and so on. Device types include desktop computing devices, mobile computing devices, tablet computing devices, wearable computing devices, and so on.

For example, the same piece of content may be associated with a higher cost when provided to a user device in the United States than when provided to a user device in Germany. For a same geographic location, content provided to a mobile device may be associated with a lower cost than when the same content is provided to a desktop device. Similarly, content associated with full screen content may generate greater revenue than content that does not occupy a full screen of the user device.

Content cost component 208 is configured to maintain information regarding average cost associated with individual pieces of content. Information regarding the average cost associated with an individual piece of content is further categorized based on a device type and geographic location of devices that have requested the individual piece of content. Although the information regarding average cost associated with individual pieces of content is discussed as being stored at the content cost component 208, this information may be stored at a location that is remote from the content cost component 208. For example, this information may be stored at a content service, such as content provider 120 illustrated in FIG. 1.

When content provider 120 receives a request for content, content cost component 208 may determine a cost associated with viewing one or more pieces of requested content. As discussed above, this cost may be determined based at least in part on a device type of the device requesting the content as well as a geographical location of the device requesting the content.

In accordance with one or more implementations, the cost associated with viewing an individual piece of requested content may be determined based on historical cost information for that requested piece of content. For example, content cost component 208 may maintain information describing previous revenue generated from the requested piece of content. When content provider 120 receives a request for the requested piece of content, content cost component 208 may determine a device type and geographical location of the device requesting the piece of content.

By using user data in combination with information describing a geographic location and a device type of a device requesting content, content cost component 208 can more accurately determine an appropriate cost for a requested piece of content. It is to be appreciated and understood that content cost component 208 may leverage any one or a combination of the above factors when determining an amount of revenue associated with a piece of content.

Alternatively or additionally, cost component 208 may determine a cost associated with a requested piece of content based on one or more subscription models offered by a provider of the requested piece of content. As discussed in further detail below, the techniques described herein allow a user to pay the cost associated with a requested piece of content in order to view the requested piece of content. Additionally or alternatively, the techniques described herein allow a user to purchase a subscription to a content provider in order to view the requested piece of content.

Having considered content cost component, consider now an advertisement detector component in accordance with one or more embodiments.

Advertisement Detector Component

In accordance with one or more implementations, advertisement detector component 210 determines whether a computing device requesting content from a content provider is preventing advertisements from being displayed at the computing device. Advertisement detector component 210 may determine whether computing device 102 is blocking advertisements based on one or more factors. These factors include, but are not limited to, determining that a first segment of content has been successfully downloaded, determining that an advertisement request call returns with an error instead of timing out, and determining that a proxy server is added in a requesting computing device's settings. If one or more of these factors are present, advertisement detector component 210 may determine that the requesting computing device 102 is running ad-blocking software or otherwise preventing advertisements from being displayed with requested content.

With certain pieces of requested content, content may not be broadcast from a content provider in a single transmission, but rather as a series of discrete segments containing content information and, in some cases, advertisement information. For example, when computing device 102 requests a piece of content 202 from content provider 120, content provider 120 may provide computing device 102 with a manifest file corresponding to the requested piece of content. The manifest file contains references to each discrete content and advertisement segment, and may be used by a content viewer of computing device 102, such as content viewer application 110 illustrated in FIG. 1. Content viewer application 110 may then use the manifest file to retrieve individual segments corresponding to the requested piece of content in a particular sequence. In some instances, the advertisement information may contain instructions for retrieving one or more advertisements and displaying the one or more advertisements with the requested piece of content. For example, the advertisement information may identify one or more of advertisements 204 to be displayed with the requested piece of content. Alternatively or additionally, the advertisement information may provide instructions for retrieving one or more advertisements from a source other than content provider 120, such as from advertisement provider 122 illustrated in FIG. 1.

In order to determine whether a requesting computing device is blocking advertisements from display, advertisement detector component 210 determines whether computing device 102 successfully downloaded a first content segment from content provider 120. Advertisement detector component 210 may determine that device 102 successfully downloaded a first content segment if content provider 120 receives a request for a subsequent content segment after providing the first content segment to the device. If advertisement detector component 210 determines that the requesting computing device 102 failed to download the first content segment, the failure is not likely caused by ad-blocking software on a computing device 102 and content provider 120 may reattempt to provide the first content segment to computing device 102. If computing device 102 successfully downloads the first content segment, advertisement detector component 210 may proceed to determine whether any additional factors indicate that computing device 102 is preventing advertisements from being displayed.

Ad-blocking software may be configured to intercept the manifest file for a requested piece of content and remove or modify any of the advertisement segments or advertisement insertion instructions before passing the manifest file to a content viewer of computing device 102. In this manner, the content viewer of computing device 102 receives the manifest file without any indication that advertisements are to be displayed with the requested piece of content. Accordingly, ad-blocking software causes the content viewer to request only content segments, ignore advertisement segments, and display the requested piece of content without any of the associated advertisements.

Under normal content viewing conditions, content provider 120 would expect to receive requests for content and advertisement segments in a sequence corresponding to the sequence indicated in the manifest file. Advertisement detector component 210 may be configured to monitor communications between the computing device 102 and content provider 120, and specifically to monitor request calls for advertisement segments. Advertisement detector component 210 may determine from the manifest file associated with a piece of requested content that, after providing a first content segment of the requested a piece of content, a request call for an advertisement segment should be requested within a certain period. From these monitored communications, advertisement detector component 210 may determine whether an anticipated request call for an advertisement segment fails due to a timeout or due to an error. If advertisement detector component 210 determines that a request call for an advertisement fails due to a timeout, the failure is likely not caused by ad-blocking software operating on a computing device 102. However, if advertisement detector component 210 determines that a request call for an advertisement segment fails due to an error, it is likely that this failure was caused by ad-blocking software running on a computing device 102. This returned error may be caused by the removal or editing of advertisement information in the manifest file corresponding to the requested content.

For example, and if a requested piece of video content and associated advertisements are provided via Hypertext Transfer Protocol (HTTP), content provider 120 would expect to receive a Uniform Resource Locator (URL) call for an advertisement segment. Under normal playback conditions, content provider 120 would return advertisement information in the form of an eXtensible Markup Language (XML) response to the URL call. If the URL call returns with an HTTP error instead of the anticipated XML response, advertisement detector component 210 may determine that advertisements are being blocked by ad-blocking software on the requesting device.

Alternatively or additionally, advertisement detector component 210 may determine that a requesting computing device is using a proxy server to block advertisements. Proxy servers are often used to intercept request calls for content segments and advertisements segments to a content provider, such as content provider 120. The proxy server then permits the request calls for content segments to pass to the content provider 120 and prohibits request calls for advertisement segments from passing to the content provider 120. Thus, advertisement detector component 210 may determine that a requesting computing device is preventing advertisements from being displayed in response to ascertaining that a proxy server entry exists in the requesting computing device's settings.

If any one or more of the above-discussed factors are present, advertisement detector component 210 may determine that the requesting computing device 102 is preventing advertisements from being displayed. In response to determining that the requesting computing device is preventing advertisements from being displayed, advertisement detector component 210 may cause content provider 120 to stop providing content to the requesting computing device. Alternatively or additionally, advertisement detector component 210 may cause content provider 120 to prevent delivered content from being displayed at requesting computing device 102.

After content delivery and/or playback has been stopped by a content provider, the content provider may determine available alternatives for viewing the requested content at the requesting computing device. Content provider 120 may then cause a content viewer application of requesting computing device 102 to display of one or more selectable options corresponding to the available alternatives for viewing the requested content. For example, content provider 120 may allow users to pay a subscription fee in order to view unlimited content from the content provider without associated advertisements. In response to detecting that a requesting computing device is preventing advertisements from being displayed, content provider 120 may cause the requesting computing device 102 to automatically display an interface that allows a user of the device to subscribe to the content provider 120. This automatic display may be performed within a content viewing application of the requesting computing device 102. Alternatively, this automatic display may comprise automatically opening a browser application of the requesting computing device and navigating the browser application to display a web page of the content provider 120 were a user may subscribe to the content provider. In response to receiving a subscription payment from the user, the content provider is configured to remove display of the subscription interface and resume display of the requested content.

Alternatively or in addition to providing an option for a user to subscribe to the content provider, the content provider may cause the requesting computing device to display an indication that ad-blocking software on the requesting computing device is preventing the requested content from being displayed. In addition to this indication, content provider 120 may cause the requesting computing device 102 to display an option to manually disable ad-blocking software on the computing device 102. In response to receiving a selection of this option to disable ad-blocking software, content provider 120 is configured to display an interface instructing a user of computing device 102 to manually disable or uninstall ad-blocking software from computing device 102 before attempting to view the requested content. In one or more embodiments, this interface includes a selectable prompt for the user to select after manually disabling the ad-blocking software. When the user selects the selectable prompt, content provider 120 will again determine whether computing device 102 is blocking display of advertisements using the techniques described herein. In response to determining that computing device 102 is no longer blocking display of advertisements, content provider 120 is configured to resume display of the requested content.

Alternatively or in addition to providing options for user to subscribe to the content provider or disable ad-blocking software from the user's computing device, the content provider may provide an option for the user to pay to view only the requested piece of content. An amount that the user will be required to pay in order to view the requested piece of content will vary based on the requested piece of content and is determined by content cost component 208, as discussed above. For example, a content provider may allow users to view instances of content on a pay-per-view basis. Content providers that offer content on a pay-per-view basis generally charge users a predetermined amount in order to view a single instance of a piece of content. If a requested piece of content is associated with a predetermined pay-per-view price, the displayed option to pay for viewing the requested content may require that a user pay the predetermined pay-per-view price. The predetermined pay-per-view price associated with a piece of content may be based on one or more factors such as perceived demand in the market for the piece of content, competitor pricing for the piece of content, a list price stipulated by the owner of the content, and so on. For example, a newly released piece of content may be perceived as having a greater demand in the market than a piece of content that has been available for a longer time, and may thus be assigned a higher price.

In accordance with one or more embodiments, an amount that the user will be required to pay in order to view the requested piece of content is based on an amount of revenue associated with the requested piece of content, as discussed above. The amount of revenue associated with the requested piece of content can vary based on a number of factors including the type of the requested content, a device type of the device requesting the content, a geographic location of the device requesting the content, user data corresponding to the device requesting the content, and so on. In response to the user selecting an option to pay a fee to view only the requested piece of content, content provider 120 is configured to display an interface for the user to pay the corresponding fee. In response to receiving a content fee from the user, the content provider is configured to remove display of the payment interface and resume display of the requested content.

Having considered an advertisement detector component, consider now an example interface of a content viewer application in accordance with one or more embodiments.

Content Viewer Interface

Figure 3:
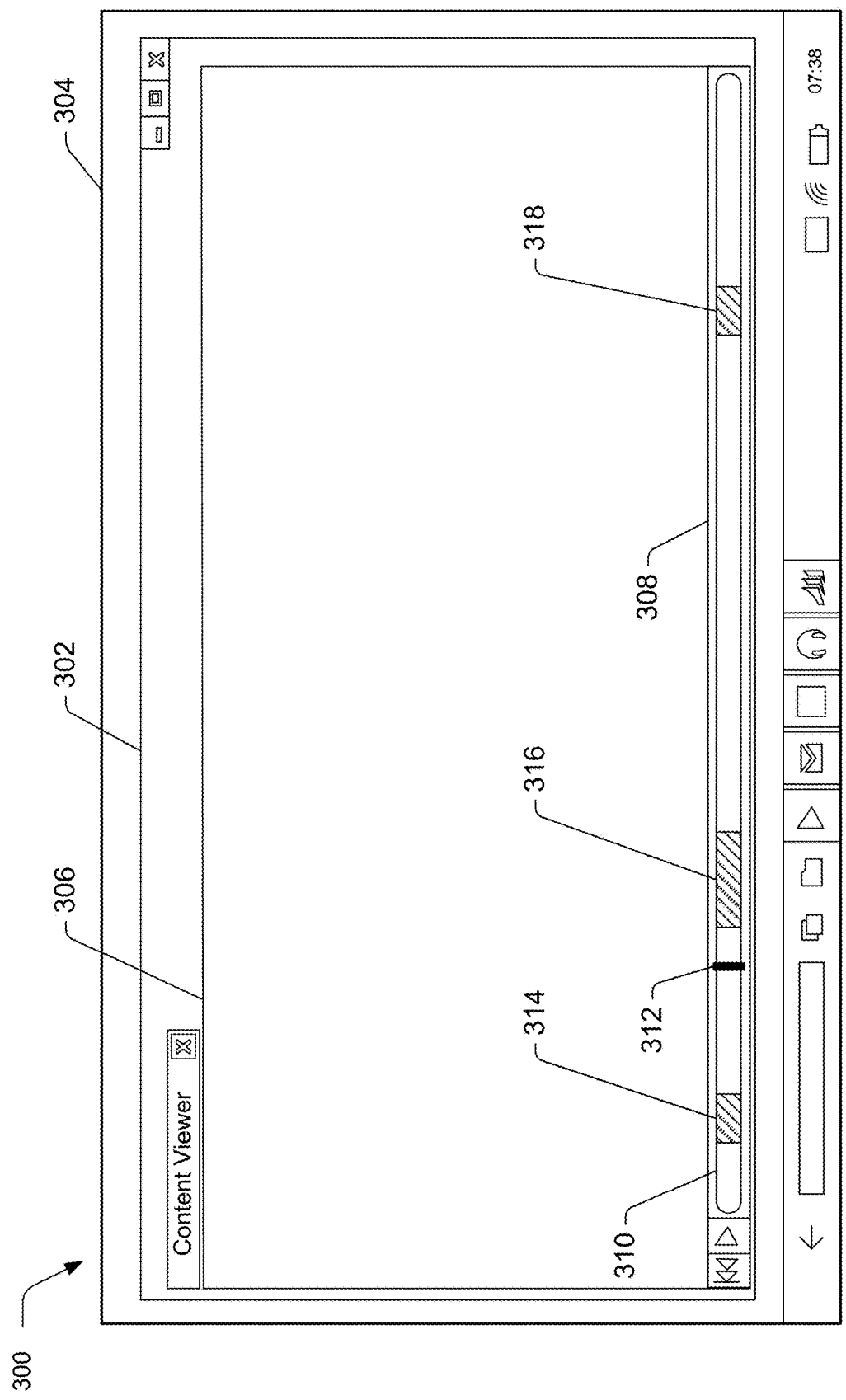
FIG. 3 illustrates an example content viewing interface in accordance with one or more implementations.

FIG. 3 illustrates an example 300 of a display of requested content in a content viewer application at a requesting computing device in accordance with one or more embodiments. A content viewer application of a computing device, such as content viewer application 110 illustrated in FIG. 1, may include an interface 302 configured to display content within a display area of 304 of the computing device. The content viewer application may include a display area 306 configured to display requested content and associated advertisements received from a content provider, such as content provider 120 illustrated in FIG. 1. The content viewer application may be any application configured to display content on the computing device. For example, a content viewer application may be configured as a web browser application, a multimedia player application, a social media application, a messaging application, and so on. In the example illustrated in FIG. 3, the content viewer application is configured as a multimedia player application that displays one or a combination of content and advertisements. Although the present example illustrates the interface 302 of the content viewer application is occupying only a portion of the display area of 304 of the computing device, it should be noted that the interface 302 may be configured to occupy the entire display area 304 of the computing device. Similarly, the interface 302 may be configured to occupy a smaller amount of the computing device's display area 304 than is illustrated in FIG. 3.

In the example illustrated in FIG. 3, the content viewer application includes a control bar 308 that may display chrome and a progress bar 310 of the content viewer application. Progress bar 310 is representative of an overall playback duration of requested content. In one or more embodiments, control bar 308 may include a status indicator 312 configured to indicate a position of the current display of requested content or advertisement with respect to the overall playback duration of the requested content. In the illustrated example, progress bar 310 includes advertisement segments 314, 316, and 318 that are scheduled to be displayed at various points during playback of the requested content. It should be noted that although three advertisement segments are illustrated as being displayed during playback of the requested content, requested content may be associated with any number of advertisements. The manner in which these advertisements may be displayed in the content viewer application is discussed in further detail below with respect to FIG. 4.

Figure 4:
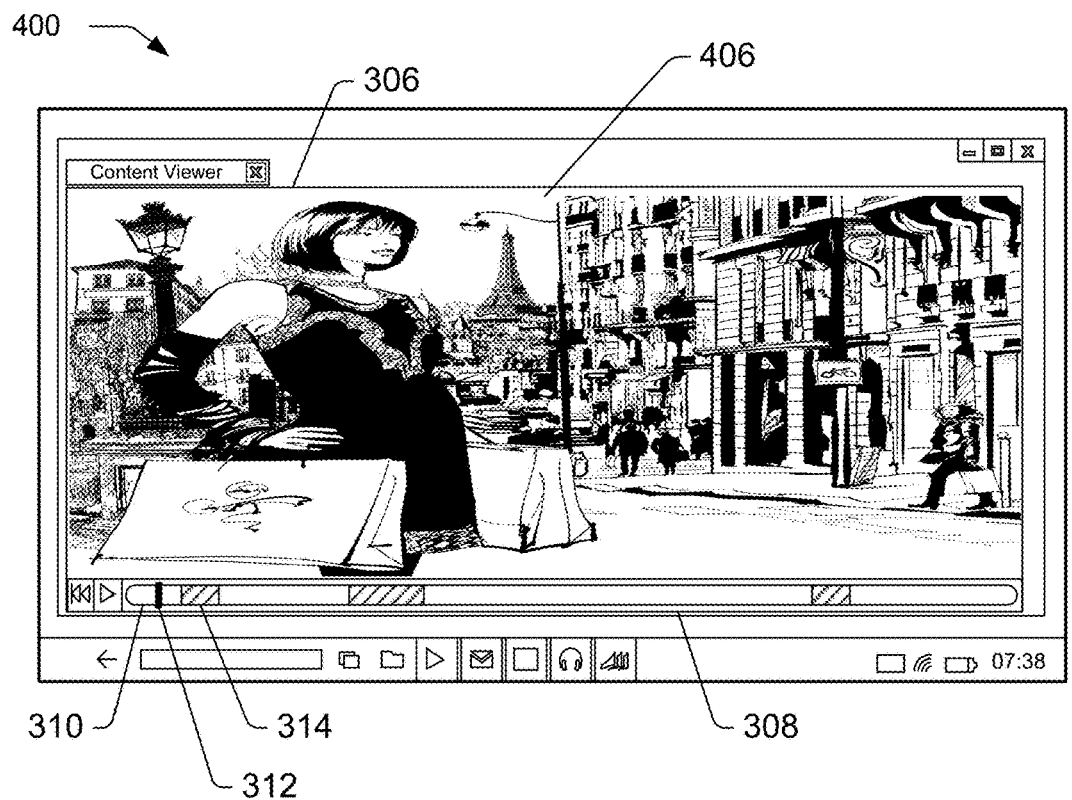
FIG. 4 illustrates an example content viewing interface displaying content and advertisements in accordance with one or more implementations.
Figure 4:
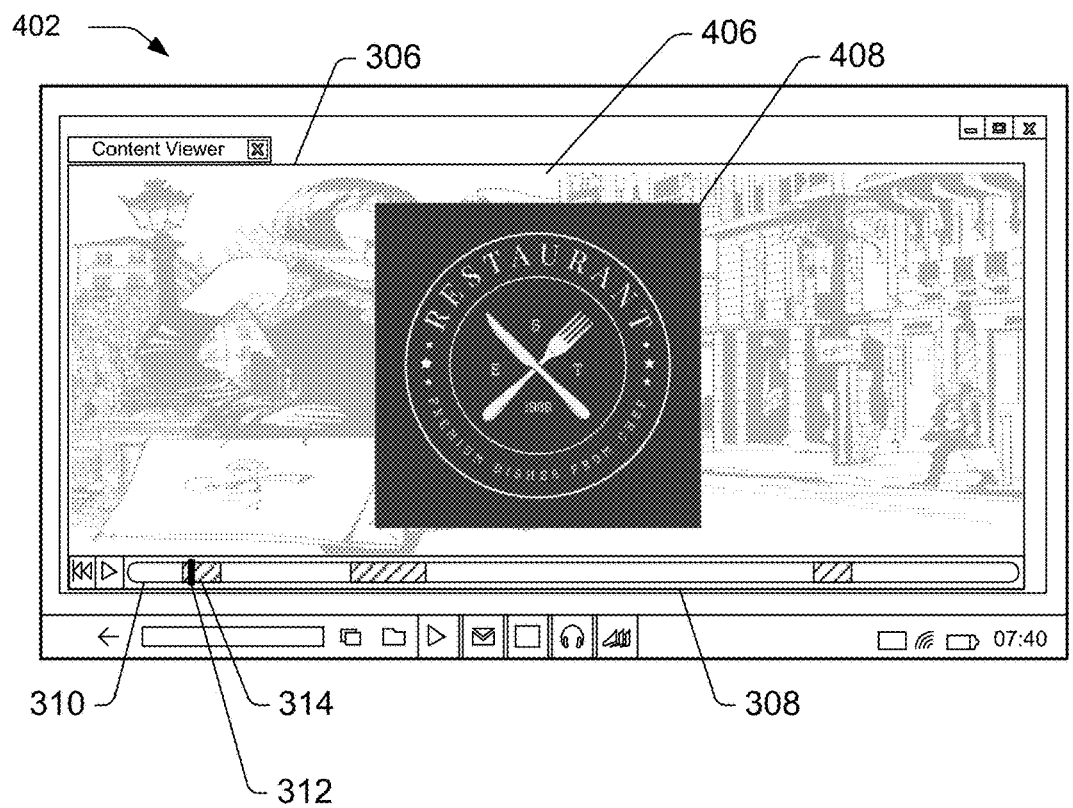

FIG. 4 illustrates an example 400 of a content viewer application displaying requested content and an example 402 of the content viewer application displaying an advertisement associated with the requested content in accordance with one or more embodiments. In the illustrated example 400, the content viewer application is configured as the multimedia player application illustrated in FIG. 3. The content viewer application is illustrated as displaying video content 406 in the display area 306 after receiving the video content 406 from a content provider, such as content provider 120 illustrated in FIG. 1.

In the illustrated example 400, the frame of video content 406 being displayed in display area 306 corresponds to a point in the overall playback duration of the video content 406 that is indicated by the displayed position of the status indicator 312 of the content viewer applications control bar 308. As playback of the video content 406 progresses, the status indicator 312 is configured to advance along progress bar 310 and indicate a current position of the display of video content 406 with respect to the overall playback duration of the video content.

In the illustrated example 402, playback of the requested video content 406 has progressed to a point that corresponds to an advertisement segment associated with requested content. This progression is illustrated by the advancement of the status indicator 312 along progress bar 310. As illustrated, the status indicator 312 now intersects advertisement segment 314. Under normal playback conditions, the content viewer application is configured to display one or more advertisements associated with the requested video content 406 at one or more points during playback of video content 406, such as the portion of the playback duration indicated by advertisement segment 314. In the illustrated example 402, the content viewer application is configured to display an advertisement 408 that is associated with the requested video content. The content viewer application is configured to maintain display of the advertisement 408 during the duration indicated by advertisement segment 314. In the illustrated example, advertisement 408 is configured as an image overlay on the video content 406, which has been visually obscured. Although illustrated as an image overlay, it is to be appreciated and understood that advertisement 408 may be configured as any type of advertisement. For example, advertisement 408 may be a video advertisement, an audio advertisement, an image advertisement, a combination thereof, and so on. Additionally, although advertisement 408 is illustrated as only occupying a portion of the display area 306, it is to be appreciated and understood that advertisement 408 may be configured occupy any portion or an entirety of the display area 306 of the content viewer application.

Advertisement 408 can be configured to be selected by a user viewing the content and associated advertisements. For example, advertisement 408 is illustrated as advertising a restaurant. When a user clicks on advertisement 408, an indication of the click may be sent to the provider of the advertisement, such as the content provider 120 or the advertisement provider 122, as illustrated in FIG. 1. In response to receiving such an indication, the provider of the advertisement may cause the computing device running the content viewer application to display a web site associated with the restaurant advertised by advertisement 408. For example, if the advertisement 408 was provided by content provider 120, content provider 120 may cause the requesting computing device to open a web browser application and navigate to a display of the web site associated with the restaurant of advertisement 408. Alternatively, content provider 120 may cause a display of the web site associated with the restaurant of advertisement 408 within display area 306 of the content viewer application.

Having considered a content viewer application configured to display requested content and associated advertisements, consider now a content viewer application that prevents display of advertisements associated with requested content.

Figure 5:
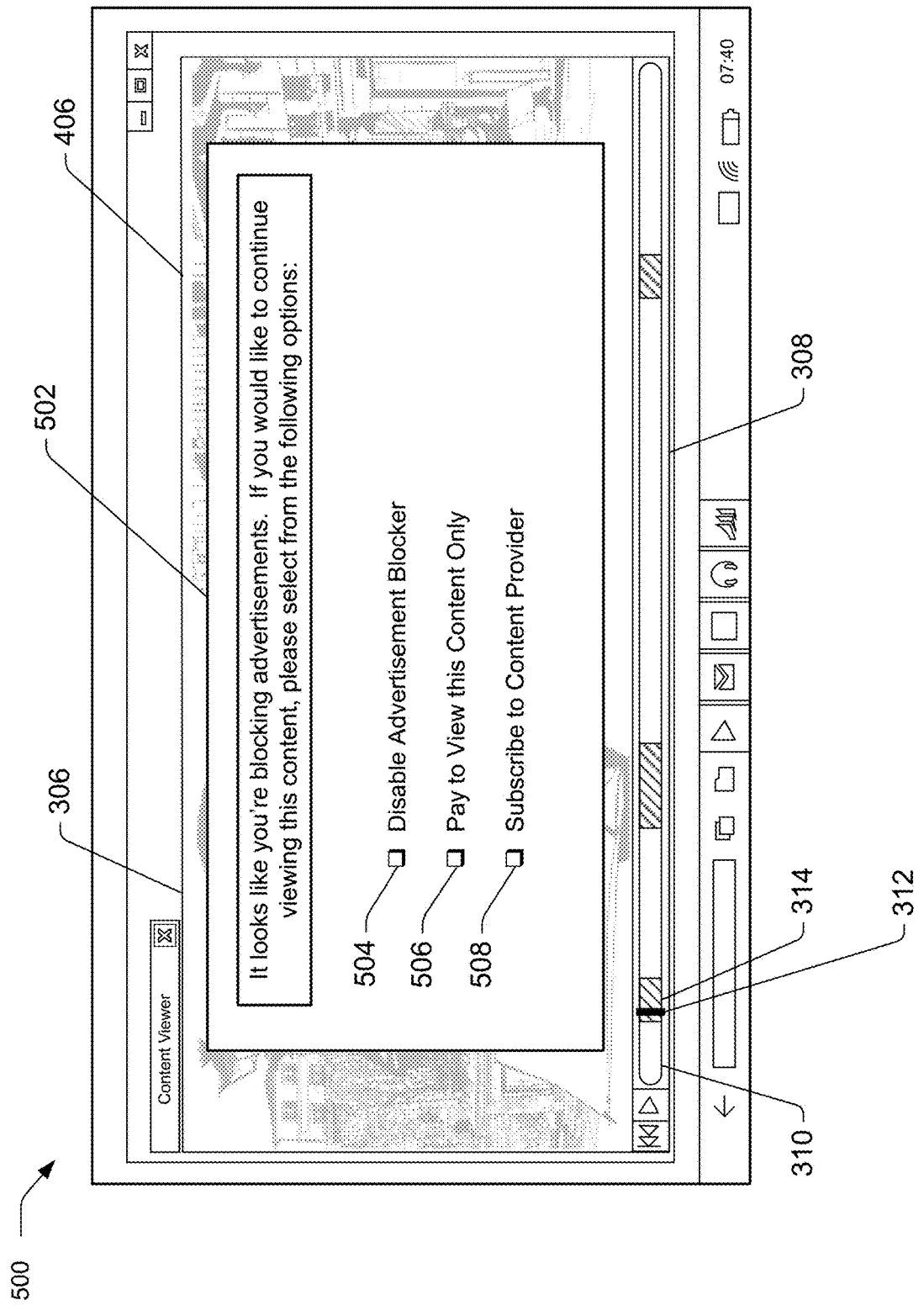
FIG. 5 illustrates an example content viewing interface displaying content viewing options in accordance with one or more implementations.

FIG. 5 illustrates an example 500 of a content viewer application that prevents display of advertisements associated with requested content. In the illustrated example 500, the content viewer application is configured as the multimedia player application illustrated in FIG. 3. The content viewer application is illustrated as displaying video content 406 in the display area 306 after receiving the video content 406 from a content provider, such as content provider 120 illustrated in FIG. 1.

In the illustrated example 500, playback of the requested video content 406 has progressed to a point that corresponds to an advertisement segment associated with the requested content. This progression is illustrated by the position of the status indicator 312 relative to the progress bar 310. As illustrated, the status indicator 312 currently intersects advertisement segment 314. Under normal playback conditions, the content viewer application is configured to display an advertisement associated with advertisement segment 314, as discussed above and illustrated in FIG. 4 at 402. However, in the illustrated example 500, the content viewer application is prevented from displaying an advertisement associated with advertisement segment 314.

The provider of the requested content 406, such as content provider 120 illustrated in FIG. 1, may determine that a requesting computing device is preventing display of advertisements using any of the techniques described herein. In response to detecting that the requesting computing device is preventing display of advertisements associated with requested content, content provider 120 may cause the content viewer application to stop display of the requested content. The content provider may additionally be configured to cause the content viewer application to display an indication to a user of the requesting computing device that the requested content cannot be displayed because the user's computing device is blocking advertisements. Content provider 120 may additionally be configured to cause the content viewer application to present one or more options that are selectable by the user and provide alternative ways to view the requested content. Conversely, in accordance with one or more implementations, content provider 120 may prevent the content viewer application from presenting the one or more options in response to detecting that the requesting computing device is not preventing display of advertisements associated with requested content.

In the present example, a provider of the requested content 406 causes the content viewer application to stop display of the requested content 406 and instead display option window 502. Option window 502 presents a visual indication to a user, within display area 306 of the content viewer application, that the requested content cannot be displayed because the content provider has detected that the user's computing device is preventing display of advertisements. In addition to this visual indication, option window 502 presents options 504, 506, and 508 for alternative ways that the user can view the requested content.

Option 504 may be selected by the user to disable the software or proxy server that is preventing advertisements from being displayed. By selecting option 504, the user can choose to disable any ad-blocking software or proxy server and continue viewing the requested content along with associated advertisements. In this manner, a user is still able to view the requested content and a content provider is still able to earn revenue from advertisements associated with the requested content.

Option 506 may be selected by the user to pay the content provider to view the requested piece of content 406 without any associated advertisements. An amount that the user will be required to pay the content provider may be determined based on revenue associated with a piece of requested content, as described herein.

Option 508 may be selected by the user to subscribe to the content provider, if the content provider associated with the requested content offers subscription models for viewing content. Alternatively, instead of presenting option 508 for selection by a user, a content provider may automatically display a subscription interface for the content provider, as discussed herein. For example, the content provider may cause display of the content providers subscription interface within option window 502. Alternatively, the content provider may cause the requesting computing device to open a web browser application and navigate to a website of the content provider within the web browser application. In one or more implementations, the content provider website may present an interface through which the user may subscribe to the content provider. If the user subscribes to the content provider via selection of option 508 or via the automatic display of the content provider's subscription interface, the content provider may permit the content viewer application to continue display of the requested content 406 without associated advertisements. In this manner, the user is able to view the requested content without advertisements and the content provider receives revenue in the form of a subscription payment instead of advertisement revenue from the advertiser.

Although the content viewer application illustrated in FIGS. 3-5 is configured as a multimedia player application, it is to be appreciated and understood that the content viewer application may be any application configured to display content on a computing device. For example, a content viewer application may be configured as a web browser application, a multimedia player application, a social media application, a messaging application, and so on.

Having considered content viewer applications that are configured to permit display of advertisements associated with requested content and prevent display of advertisements associated with requested content, consider now example procedures in accordance with one or more embodiments.

Example Procedures

Figure 6:
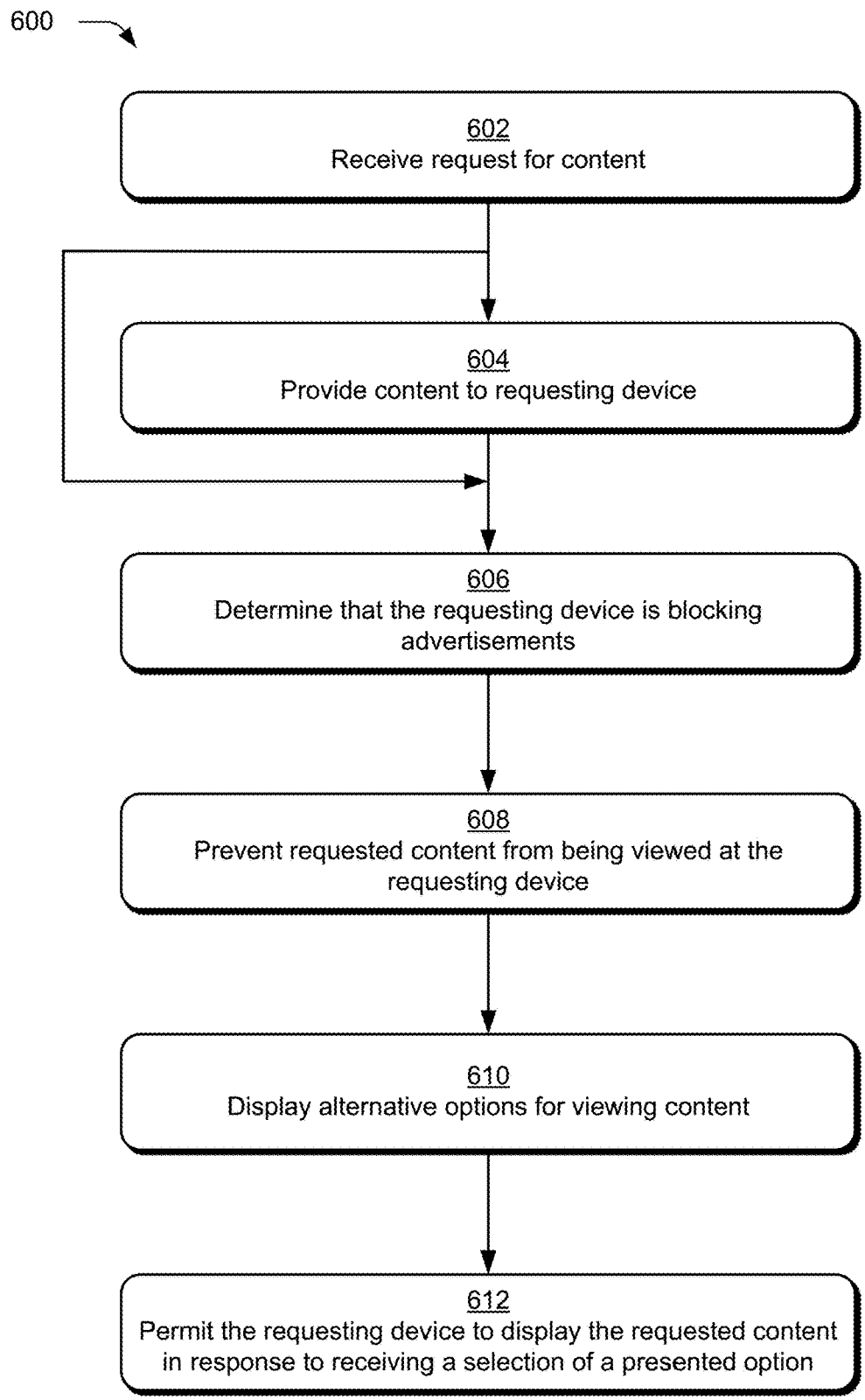
FIG. 6 is a flow diagram depicting an example procedure in accordance with one or more implementations.

FIG. 6 illustrates an example procedure 600 for providing requested content to a computing device and presenting options for a user to view the requested content when the computing device is preventing display of advertisements in accordance with one or more embodiments described herein. Aspects of the procedure may be implemented in hardware, firmware, or software, or a combination thereof. The procedures are shown as a set of blocks that specify operations performed by one or more devices and are not necessarily limited to the order shown for performing the operations by the respective blocks. In at least some embodiments, the procedures may be performed in a digital medium environment by a suitably configured device, such as the example content provider 120 of FIG. 2 that makes use of an advertisement detector component 210, such as that described above.

A request for content is received from a requesting computing device by a content provider of the content (block 602). In accordance with one or more implementations, the request may be received from a requesting computing device, such as computing device 102 of FIG. 1 via a network, such as network 118 of FIG. 1.

The requested content is then optionally provided by the content provider to the requesting computing device (block 604). In accordance with one or more implementations, providing content to the requesting device may include providing a manifest file associated with the content along with the first portion of the content, as described above. Similarly, providing content to the requesting device may also include providing one or more advertisements associated with the content to the requesting computing device, as described above.

The content provider then determines that the requesting computing device is blocking display of advertisements associated with requested content (block 606). This determination may be made by the content provider using the factors discussed above in the process illustrated in FIG. 7, as described below.

In response to determining that the requesting computing device is blocking display of advertisements associated with the requested content, the content provider prevents requested content from being viewed at the requesting computing device (block 608). The content provider may be configured to prevent display of requested content in a content viewer application of the requesting computing device using any of the techniques described herein. For example, the content provider may cause the content viewer application of the requesting computing device to visually obscure any requested content that has been provided to the requesting computing device.

After the content provider prevents display of requested content at the requesting computing device, the content provider presents a user of the requesting computing device with alternative options for viewing the requested content (block 610). Presented options may include an option for the user to purchase a subscription with the content provider, an option for the user to pay for viewing the requested content without associated advertisements, or an option to disable a proxy server or software that is preventing advertisements from being displayed at the requesting computing device. Alternatively, the content provider may present the user with the option to purchase a subscription with the content provider. This option may be presented by causing the requesting computing device to automatically display a subscription interface for the content provider. In addition to presenting these options, the content provider may provide a visual indication to a user of the requesting device that the user is unable to view the requested content because advertisements are being blocked on their device. This provides alternatives for users who want to view content, but not advertisements, without requiring the user to search for a different content provider.

When the user enables display of advertisements on the requesting computing device or pays to view the requested content in the form of either a subscription payment or a one-time payment, the content provider permits the requesting computing device to display the requested content (block 612). This enables a content provider to obtain revenue from provided content when a requesting computing device otherwise blocks advertisements.

Having considered an example procedure for providing requested content to a computing device and presenting options for a user to view the requested content when the computing device is preventing display of advertisements, consider now an example procedure that can be utilized to detect whether are requesting computing device is blocking advertisements.

Figure 7:
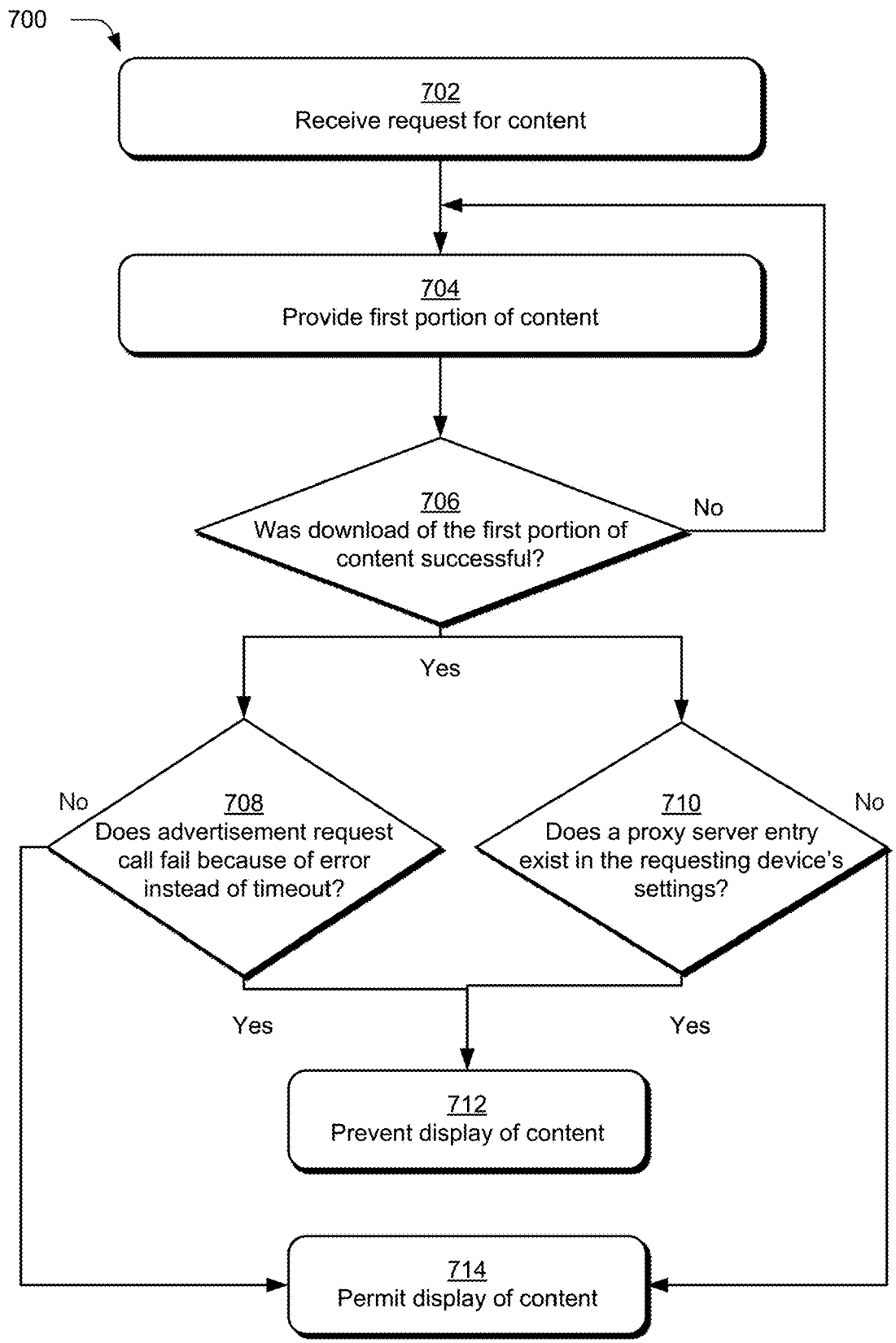
FIG. 7 is a flow diagram depicting an example procedure in accordance with one or more implementations.

FIG. 7 illustrates an example procedure 700 for detecting whether a computing device is preventing the display of advertisements in accordance with one or more embodiments described herein. Aspects of the procedure may be implemented in hardware, firmware, or software, or a combination thereof. The procedures are shown as a set of blocks that specify operations performed by one or more devices and are not necessarily limited to the order shown for performing the operations by the respective blocks. In at least some embodiments, the procedures may be performed in a digital medium environment by a suitably configured device, such as the example content provider 120 of FIG. 2 that makes use of an advertisement detector component 210, such as that described above.

Procedure 700 begins when a content provider receives a request for content (block 702). In accordance with one or more implementations, the request may be received from a requesting computing device, such as computing device 102 of FIG. 1 via a network, such as network 118 of FIG. 1.

In response to receiving a request for content, the content provider provides at least the first portion of content to the requesting computing device (block 704). In accordance with one or more implementations, providing at least the first portion of the content to the requesting computing device may include providing a manifest file associated with the content, as described above. Similarly, providing at least the first portion of the content to the requesting device may also include providing one or more advertisements to the requesting computing device, as described above.

After at least the first portion of content has been provided to the requesting computing device, the content provider determines whether the requesting computing device successfully downloaded the first portion of content (block 706). The content provider may be configured to determine whether the requesting computing device successfully downloaded the first portion of content by monitoring communications between the computing device and the content provider, as described above. If the content provider determines that the requesting computing device did not successfully download the first portion of content, the content provider may be configured to return to block 704 and reattempt and to provide at least the first portion content to the requesting computing device.

If the content provider determines that the requesting computing device successfully downloaded the first portion of content, the content provider proceeds to determine whether the requesting computing device is preventing advertisements from being displayed. As discussed above, the content provider can determine whether the requesting computing device is preventing advertisements from being displayed via one or more factors.

One of these factors includes determining whether a request call for an advertisement, from the requesting computing device to the content provider, fails due to an error instead of a timeout (block 708). If a request call for an advertisement fails because of an error instead of a timeout, the content provider may determine that the failure was caused by software blocking advertisements at the requesting computing device. Alternatively, if are request call for an advertisement fails due to a timeout, the content provider may determine that the failure was not caused by software blocking advertisements at the requesting computing device.

Another factor in determining whether the requesting computing device is preventing advertisements from being displayed includes determining whether a proxy server entry exists in the settings of the requesting computing device (block 710). If a proxy server entry exists in the settings of the requesting computing device, the content provider may determine that a proxy server is blocking advertisements at the requesting computing device. Alternatively, if no proxy server is detected in the settings of the requesting computing device, the content provider may determine that the requesting computing device is not blocking advertisements.

The factors ascertained by the content provider via the determinations listed in blocks 708 and 710 may be used separately, or in combination with one another, to determine whether a requesting computing device is blocking advertisements from being displayed.

In response to determining that the requesting computing device is preventing advertisements from being displayed, the content provider may prevent requested content from being displayed at the requesting computing device (block 712). The content provider may be configured to prevent display of requested content in a content viewer application of the requesting computing device using any of the techniques described herein. For example, the content provider may cause the content viewer application of the requesting computing device to visually obscure any requested content that has been provided to the requesting computing device.

In response to determining that the requesting computing device is not preventing advertisements from being displayed, the content provider may permit requested content to be displayed at the requesting computing device (block 714). In this manner, content providers that generate revenue by displaying advertisements with requested content are able to protect their revenue streams from advertisement-blocking proxy servers or software.

Having considered example procedures in accordance with one or more implementations, consider now an example system and device that can be utilized to practice the inventive principles described herein.

Example System and Device

Figure 8:
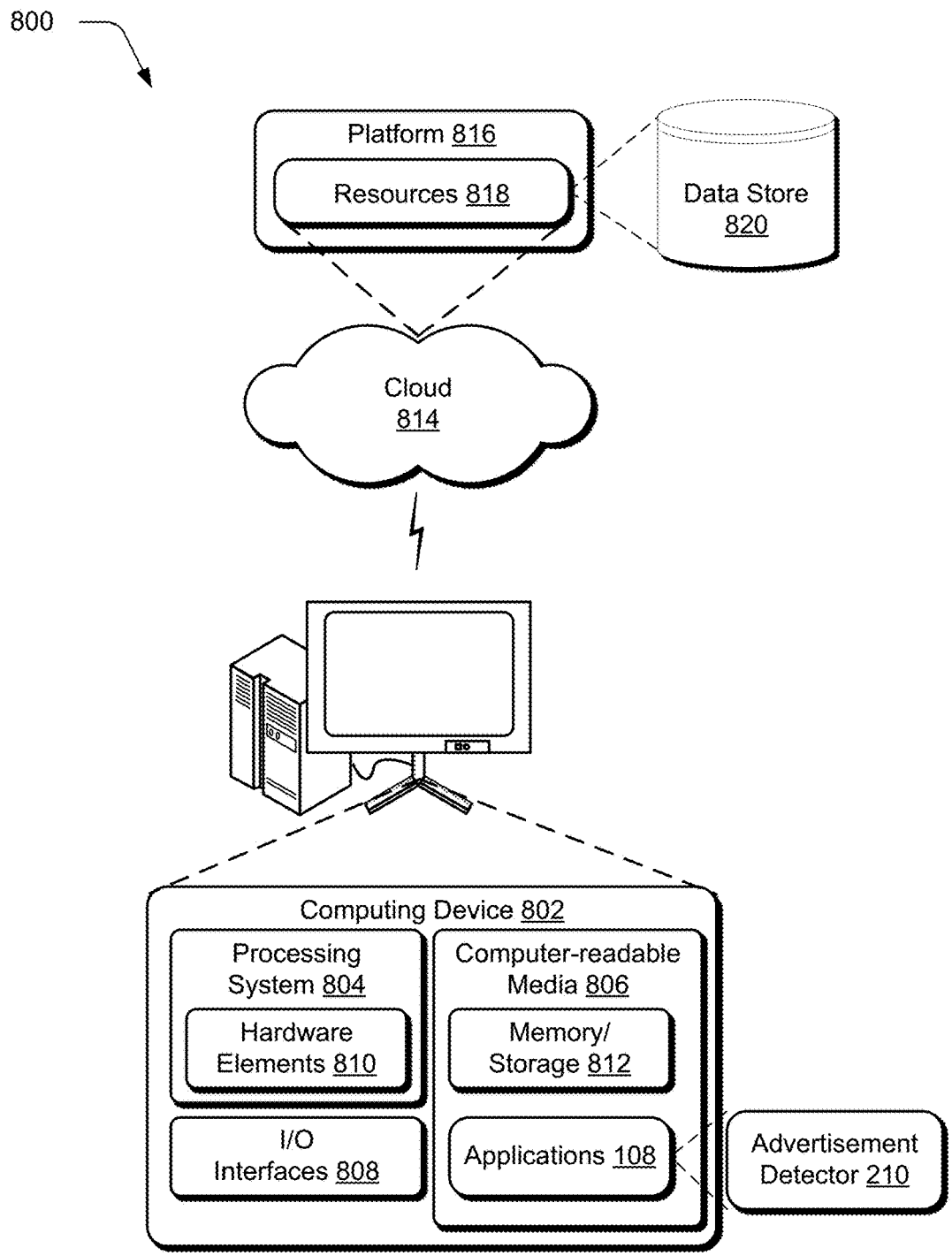
FIG. 8 illustrates an example system including various components of an example device that can be employed for one or more advertisement detection and content viewing implementations described herein.

FIG. 8 illustrates an example system generally at 800 that includes an example computing device 802 that is representative of one or more computing systems and/or devices that may implement the various techniques described herein. This is illustrated through inclusion of the applications 108 and, in particular, advertisement detector 210, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data of a data store 820 that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

In one or more implementations, a digital medium environment includes a content provider that provides content to a requesting computing device. An improved advertisement detection method implemented by the content provider comprises determining whether the requesting computing device permits display of advertisements that are provided with requested content. The method is performed by ascertaining whether the requesting computing device successfully downloaded a first portion of requested content, whether an advertisement request from the requesting computing device fails due to an error, and whether a proxy server exists in the settings of the requesting computing device. The method comprises determining an amount of advertisement revenue associated with a piece of requested content based on factors including the type of content requested, a device type of the requesting computing device, a geographic location of the requesting computing device, and user data associated with the requesting computing device. The method further comprises preventing display of requested content at the requesting computing device in response to determining that the requesting computing device is preventing display of advertisements and providing one or more options to resume display of the requested content. Options for resuming display the requested content include purchasing a subscription to the content provider, paying the content provider to view the requested content without advertisements, or disabling a proxy server or software blocking advertisements at the requesting computing device. Thus, a content provider using the advertisement detection method ensures that revenue is generated from content provided with advertisements, even if the requesting computing device blocks advertisements.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment that includes an advertisement detection component of a content provider, an improved advertisement detection method implemented by the content provider, the method comprising:
   receiving a request for content from a computing device;
   providing a manifest file for the requested content to the computing device, the manifest file including references to at least one content segment and at least one advertisement segment;
   determining that the computing device prevents advertisements from being displayed at the computing device in response to determining that the computing device successfully requests the at least one content segment and does not request the at least one advertisement segment;
   providing at least a first portion of the requested content to the computing device and subsequently preventing the at least one requested content segment from being displayed at the computing device in response to determining that the computing device prevents advertisements from being displayed; and causing the computing device to display one or more alternative options for displaying the requested content.

2. A method as described in claim 1, further comprising permitting the computing device to display the requested content in response to receiving a selection of one of the one or more alternative options.

3. A method as described in claim 1, wherein determining that the computing device does not request the at least one advertisement segment is performed in response to determining that a call request for the at least one advertisement segment fails because of an error or a timeout.

4. A method as described in claim 1, wherein the requested content comprises one or more of video content, audio content, multi-media streaming content, game content, animation content, image content, web document content, web page content, or an application.

5. A method as described in claim 1, further comprising causing the computing device to display a visual indication that the requested content cannot be displayed because the computing device is preventing advertisements from being displayed.

6. A method as described in claim 1, wherein the one or more displayed alternative options include one or more of:
   an option to disable a proxy server or software preventing advertisements from being displayed at the computing device;
   an option to purchase a subscription to the content provider; or
   an option to pay the content provider to view the requested content.

7. A method as described in claim 1, wherein causing the computing device to display one or more alternative options for displaying the requested content comprises causing the computing device to automatically open a web browser application and navigate to a subscription interface of the content provider.

8. In a digital medium environment in which a content provider device can use an advertisement detector component to determine if advertisements are blocked, one or more computer-readable storage media storing instructions that implement the advertisement detector component which, responsive to execution by the content provider device, perform improved advertisement detection operations comprising:
   receiving a request for a piece of content from a computing device;
   providing a manifest file for the requested content to the computing device, the manifest file including references to at least one content segment and at least one advertisement segment;
   determining that the computing device prevents advertisements from being displayed in response to determining that the computing device:
      successfully requests the at least one content segment;
      does not request the at least one advertisement segment; and
      requests an additional one of the at least one content segment;
   preventing the requested piece of content from being displayed at the computing device in response to determining that the computing device prevents advertisements from being displayed;
   causing the computing device to display one or more options for a user of the computing device to pay a content provider in order to view the requested piece of content; and permitting the computing device to display the requested piece of content in response to receiving payment from the user of the computing device to view the requested content.

9. One or more computer-readable storage media as described in claim 8, wherein a cost that the user of the computing device must pay to view the requested piece of content is based on:
   a device type of the computing device that is requesting the piece of content;
   a geographical location of the computing device that is requesting the piece of content; and
   historical cost information associated with the requested piece of content.

10. One or more computer-readable storage media as described in claim 8, wherein a cost that the user of the computing device must pay to view the requested piece of content is based on an average cost associated with the requested piece of content.

11. One or more computer-readable storage media as described in claim 8, wherein the one or more options include an option to disable a proxy server or software that is preventing the one or more advertisements from being displayed at the computing device.

12. One or more computer-readable storage media as described in claim 8, wherein the one or more options include an option to purchase a subscription to the content provider.

13. One or more computer-readable storage media as described in claim 8, wherein the one or more options include an option to pay a one-time payment to the content provider to view the requested piece of content.

14. A system including a content provider device having an advertisement detector component to enable advertisement detection, the system comprising:
   a processing system;
   one or more computer readable media storing instructions executable via the processing system to implement an advertisement detection application configured to perform operations comprising:
      receiving a request for content from a computing device;
      providing a manifest file for the requested content to the computing device, the manifest file including references to at least one content segment and at least one advertisement segment;
      determining that the computing device is preventing display of the one or more advertisements in response to determining that the computing device:
         successfully requests the at least one content segment;
         does not request the at least one advertisement segment; and
         requests an additional one of the at least one content segment;
      preventing the requested content from being displayed at the computing device in response to determining that the computing device is preventing display of the one or more advertisements;
      causing the computing device to display a visual indication that the requested content cannot be displayed because the computing device is preventing display of advertisements;
      causing the computing device to display one or more alternative options that are selectable by a user of the computing device to continue viewing the requested content; and
      permitting the computing device to display the requested content in response to receiving a selection of one of the one or more displayed alternative options to continue viewing the requested content.

15. The system as described in claim 14, wherein the one or more displayed alternative options include an option to disable a proxy server or software that is preventing the one or more advertisements from being displayed at the computing device.

16. The system as described in claim 14, wherein the one or more displayed alternative options include an option to purchase a subscription to the content provider.

17. The system as described in claim 14, wherein the one or more displayed alternative options include an option to pay the content provider to view the requested content.

18. The system as described in claim 14, wherein the requested content comprises one or more of video content, audio content, multi-media streaming content, game content, animation content, image content, web document content, web page content, or an application.

19. The system as described in claim 14, wherein determining that the computing device is preventing display of the one or more advertisements is performed in response to at least one of:
   determining that a proxy server entry exists in the computing device's settings; or
   determining that one or more call requests for an advertisement segment associated with the requested content fails because of an error or a timeout.

20. The system as described in claim 14, wherein a cost that the user of the computing device must pay to view the requested content is based on:
   a device type of the computing device that is requesting the content;
   a geographical location of the computing device that is requesting the content; and
   historical cost information associated with the requested content.

* * * * *